Figure 1:
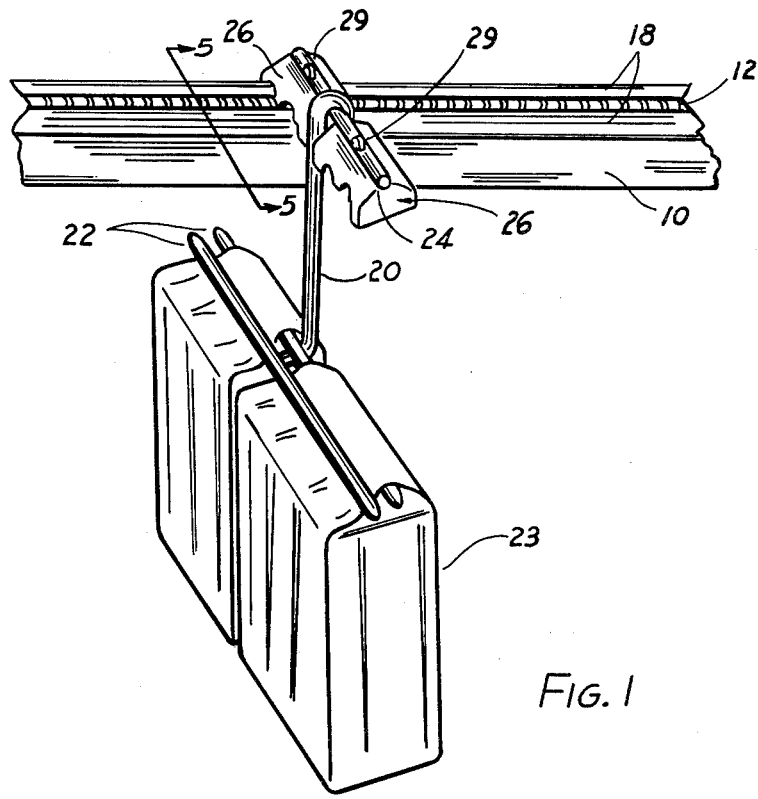

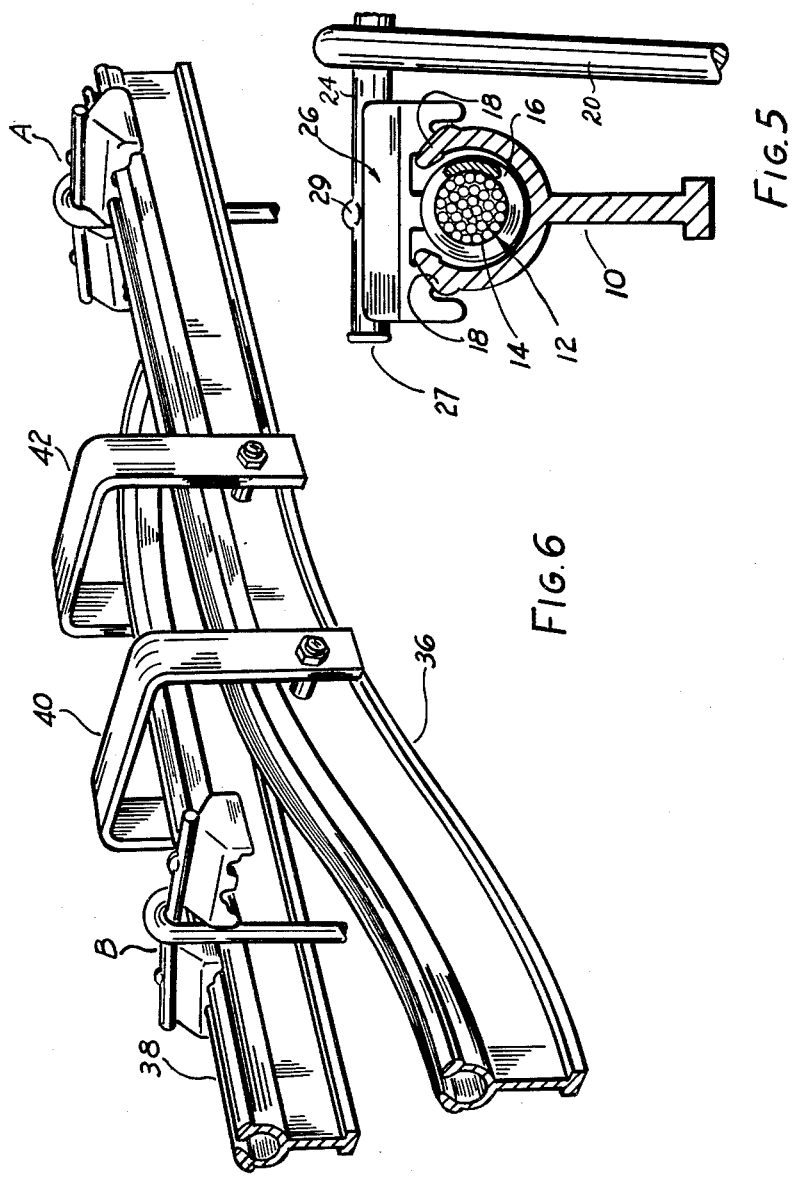

United States Patent Office 3,051,096
Patented Aug. 28, 1962

3,051,096
ARTICLE CARRIER FOR OVERHEAD CONVEYOR
John C. Walsh, William M. Haselton, Edward T. Holland, Jr., and Kenneth P. Juhl, all of Cedar Rapids, Iowa, assignors to Cherry-Burrell Corporation, Cedar Rapids, Iowa, a corporation of Delaware
Filed Apr. 25, 1960, Ser. No. 24,336
4 Claims. (Cl. 104—167)

This invention relates to a conveyor hook structure and more particularly to an improved conveyor hook for translating the rotary motion of a spiral drive shaft into linear motion thereby to move an article or load along a predetermined path.

In U.S. Patent No. 2,911,802 and in co-pending applications, Serial No. 518,807, filed June 29, 1955, entitled "Conveyor Structure," Serial No. 666,023, filed June 17, 1957, now Patent No. 3,002,635, entitled "Conveyor and System," and Serial No. 16,610, filed March 21, 1960, entitled "Conveyor Rail Structure and Method of Making the Same," all filed in the name of Edward T. Holland, Jr., there are disclosed various inventions relating to an overhead type conveyor utilizing a flexible spiral driveshaft to translate rotary motion into linear motion. As shown in these applications and in the patent, the hook upon which the load is suspended rides on a rail and is moved by engagement with the spiral winding on the drive-shaft either directly or through a projecting nib. It is to this structure that our invention pertains.

As compared to the prior art, the conveyor hook disclosed herein is capable of carrying increased loads while substantially eliminating wear on the conveyor rail itself. Also, our novel hook structure practically eliminates slippage on inclines, and if for any reason movement of the load should be hindered, there will be no damage to the conveyor drive-shaft. Our novel hook structure permits replacement of a part of the hook without replacement of the entire assembly as was heretofore necessary. A further advantage of our invention is that, if desired, a driveshaft engaging member may be positioned on each side of the depending portion of the hook, thereby permitting simple and rapid transfer of the load from one portion of the conveyor system to the other.

It is therefore a principal object of our invention to provide a conveyor hook structure that is capable of carrying increased loads, particularly when traveling up an incline, on a conveyor of the spiral drive-shaft type.

It is another object of our invention to provide a conveyor hook structure that will substantially eliminate wear on the major components of the conveyor, namely, the top surfaces of the rail housing and the drive-shaft itself.

It is a further object of our invention substantially to eliminate the possibility of "slippage" particularly when the load is traveling up an incline. In other words, our invention substantially does away with the possibility of the helical windings failing to engage the hook with sufficient force to propel it up an incline.

It is a still further object of our invention to eliminate the possibility of damage to the main conveyor components if movement of the load or article being conveyed should become hindered or stopped while the drive-shaft continues rotating.

It is a still further object of our invention to provide a novel hook structure utilizing a double shaft engaging member thereby facilitating the transfer of the load from one conveyor line to another.

It is a still further object of our invention to provide a hook structure that is relatively easy to manufacture, inexpensive, and one that when excessively worn does not require replacement of the entire assembly.

Figure 2:
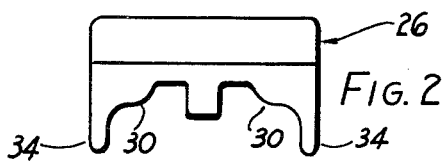
Figure 3:
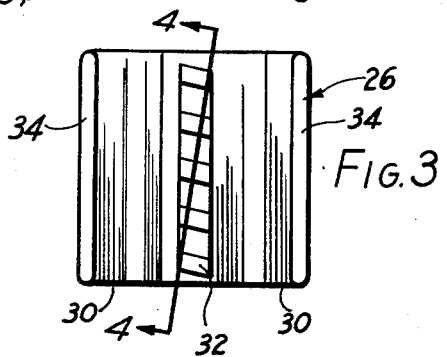
Figure 4:
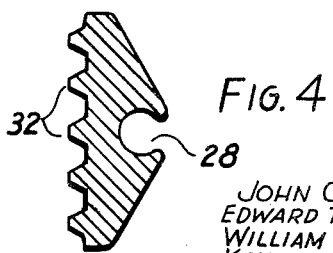

These and other objects of our invention will be readily apparent from a consideration of the following description taken in connection with the accompanying drawings in which:

FIGURE 1 is a perspective view of a short section of a conveyor and showing our novel hook structure;
FIGURE 2 is an end view of the drive-shaft engaging member of the hook structure;
FIGURE 3 is a bottom view of the drive-shaft engaging member shown in FIGURE 2;
FIGURE 4 is a sectional view of the drive shaft engaging member taken on the line 4—4 of FIGURE 3 and showing the shape of the teeth;
FIGURE 5 is a sectional view taken on the line 5—5 of FIGURE 1; and
FIGURE 6 is a perspective view of a portion of a conveyor system illustrating the structure necessary to effect transfer from one conveyor line to another.

Referring to FIGURE 1, the conveyor consists of a rail housing 10 and a spiral drive-shaft 12 rotatable in the housing 10. The drive-shaft 12 is made up of a number of windings of wire that form a torsionally rigid but laterally flexible core 14 (FIGURE 5). Wound on the exterior of the core 14 is a helical winding 16 which we prefer to make of stainless steel. The details of the construction of this flexible spiral drive-shaft are more fully set forth in U.S. application Serial No. 518,807 referred to above. As best seen in FIGURE 5, the drive-shaft 12 is preferably more than half surrounded by the C-shaped portion of the housing 10 and the top of the shaft 12 is below the upper surfaces 18 of the rail housing 10.

The conveyor hook structure comprises a depending rod 20 to the bottom of which there is attached a pair of transverse rods 22 adapted to carry a package 23. Depending on the type of article or load to be carried, other suitable means can be substituted for the rods 22. The upper part of the rod 20 is bent over and secured to a cross bar 24. On each side of the rod 20 and affixed to the cross bar 24 there is a drive-shaft engaging member, indicated generally by the reference numeral 26, which we have termed for the sake of brevity a "rack." The racks 26 are preferably constructed of a plastic material, such as nylon, that has good wear resistance coupled with low friction and adequate strength. Racks 26 are each secured to the cross bar 24 by providing an interference fit between the bar 24 and the opening to a circular groove 28 formed in the top of rack 26 along its entire width. Since the plastic material nylon has a certain amount of resilience, the racks 26 can be snapped onto the bar 24 and they will remain in place throughout normal use. The diameter of the groove 28 is itself slightly larger than the diameter of the bar 24 so that rack 26 can pivot freely on the bar 24. To prevent the racks 26 from slipping off the ends of the bar 24, a flange 27 preferably is formed on each end of the bar 24. Also, a projection 29 formed by "pinching" the bar 24 is provided on the top of the bar 24 to prevent the rack 26 from turning upside down on the bar 24 and becoming out of position for rapid placement on the conveyor.

Referring now to FIGURES 2 and 3, the details of the rack 26 will be described. On the lower side of the rack 26 there are formed two surfaces 30. These two surfaces 30 extend parallel to one another and are spaced apart, one near each side of the rack 26. They are spaced a distance equal to the spacing of the top surfaces 18 of the rail housing 10, thereby providing "runners" upon which the rack 26 can slide as it is moved by action of the drive-shaft 12. In the center of the rack 26 there are five projections or teeth 32 formed at an angle that corresponds to the helix angle of the winding 16 on the drive-shaft 12. Also, the spacing of the teeth 32 should correspond to the pitch of the winding 16 and their depth must be sufficient to engage the winding 16 of drive-shaft 12 when the runners 30 are properly seated on the surfaces 18 of rail housing 10.

We also prefer to make the teeth 32 tapered as it is difficult to maintain a uniform pitch in the winding 16 because of its flexibility. If teeth 32 were made uniformly thick, they might jam between the convolutions of winding 16 and cause breakage of the teeth 32. The tapered teeth avoid this possibility by allowing rack 26 to "ride up" and position itself without jamming. We have found that tooth breakage is thereby substantially eliminated.

To give the rack 26 added stability, we also prefer to provide on each side thereof a flange or lip 34 which will overlap the sides of the rail housing 10. This will assure proper engagement of the teeth 32 with winding 16 and tends to prevent the rack 26 from slipping off the rail housing 10.

Referring now to FIGURE 6, the purpose of providing side-by-side racks 26 can be readily understood. The transfer assembly or switch shown in FIGURE 6 consists of two sections 36 and 38 of rail housing 10. Sections 36 and 38 are held the proper distance from one another by a set of brackets 40 and 42 which also serve to support the assembly. Transfer from one section 36 to the other section 38 is made very simply.

Note that the two sections 36 and 38 of the conveyor system first converge toward and then diverge from each other both in a horizontal plane and a vertical plane. Assume, for example, that a load being carried by a hook assembly is moving along conveyor 36, from right to left in FIGURE 6, with one of the "twin" racks 26 riding on section 36 while the other rack 26 extends outward. This load-carrying hook assembly is indicated in FIGURE 6 by the letter "A." As the hook assembly "A" moves from right to left, the rack 26 extending outward from the section 36 will eventually reach a point where it will be placed on the section 38. Then as the assembly continues to travel from right to left, it will remain on section 38 and be "lifted" off section 36 as that section curves downward. The position of load-carrying hook assembly after transfer to section 38 is illustrated in FIGURE 6 and identified by the letter "B."

Thus, it is seen that the transfer from one conveyor section to another is easily made possible by the "double rack" design. The transfer assembly requires no special parts other than the brackets 40 and 42, the conveyor sections 36 and 38 being formed from the standard rail housing 10.

It is thus seen that we have provided a simple and inexpensive transfer means and also a greatly improved means of translating the rotary motion of the spiral drive-shaft 12 into linear movement of an article. Our novel device also has superior wear qualities, and because it sustains the wear, wear on the rail housing 10 and drive-shaft 12 is practically eliminated without the necessity of lubrication.

Having thus described our invention, it will be apparent to those skilled in the art that various modifications may be made without departing from the spirit and scope of the invention. It is our intention that any such revisions or variations of the invention as are reasonably expected on the part of those skilled in the art will be included within the scope of the following claims.

We claim:

1. For use with an overhead conveyor having a spiral drive shaft rotatable in a housing that provides load supporting surfaces, an article carrier comprising a pair of runners laterally spaced apart an amount to engage said surfaces slidingly, a plurality of projections between said runners adapted to engage said drive shaft, and a flange extending downwardly outside each of said runners to engage the exterior of said housing, said runners, projections and flanges forming a one-piece shaft engaging member, said member being formed of a low friction, wear resistant material.

2. For use with an overhead conveyor having a spiral drive shaft rotatable in a housing that provides load supporting surfaces, an article carrier comprising a pair of runners laterally spaced apart an amount to engage said surfaces slidingly, a plurality of projections between said runners adapted to engage said drive shaft, said runners and said projections forming a one-piece member, said member being formed of a low friction, wear resistant material and having on the side opposite said projections a circular shaped groove extending laterally across the length of said member, and a round bar pivotally seated in said groove, said bar having connected thereto means for supporting the article to be conveyed.

3. The article carrier of claim 1 in which said projections are substantially rectangular in cross-section and tapered.

4. The article carrier of claim 3 in which said projections are at an angle with said runners, the angle corresponding to the pitch of said spiral drive shaft.

References Cited in the file of this patent

UNITED STATES PATENTS

| | | |
|---|---|---|
| 1,774,360 | Drengwitz | Aug. 26, 1930 |
| 2,681,015 | Davis | June 15, 1954 |
| 2,726,077 | Dow | Dec. 6, 1955 |
| 2,908,379 | Hamilton | Oct. 13, 1959 |